(12) United States Patent
Beato et al.

(10) Patent No.: US 8,306,368 B2
(45) Date of Patent: Nov. 6, 2012

(54) STORING AND PRESENTING ANCILLARY INFORMATION OBTAINED FROM SCANNED PRINTS

(75) Inventors: Louis J. Beato, Rochester, NY (US); Joseph A. Manico, Rochester, NY (US); Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 1080 days.

(21) Appl. No.: 11/839,711

(22) Filed: Aug. 16, 2007

(65) Prior Publication Data

US 2009/0046934 A1 Feb. 19, 2009

(51) Int. Cl.
*G06K 9/46* (2006.01)
*G06K 9/54* (2006.01)
*G06K 9/60* (2006.01)
*G06F 3/00* (2006.01)
*G06F 17/00* (2006.01)

(52) U.S. Cl. ........ 382/305; 382/232; 382/248; 382/306; 715/200; 715/700

(58) Field of Classification Search .................. 382/305, 382/232, 248, 306; 715/200, 700
See application file for complete search history.

(56) References Cited

U.S. PATENT DOCUMENTS

| | | | |
|---|---|---|---|
| 5,032,918 A | 7/1991 | Ota et al. | |
| 5,815,201 A | 9/1998 | Hashimoto et al. | |
| 5,940,844 A * | 8/1999 | Cahill et al. | 715/268 |
| 6,683,649 B1 | 1/2004 | Anderson | |
| 6,760,491 B2 * | 7/2004 | Lange et al. | 382/321 |
| 6,915,012 B2 | 7/2005 | Osborne et al. | |
| 7,372,482 B2 * | 5/2008 | Smith | 348/207.2 |
| 7,783,135 B2 * | 8/2010 | Gokturk et al. | 382/305 |
| 2002/0067851 A1 | 6/2002 | Lange et al. | |
| 2003/0122806 A1 * | 7/2003 | Edge | 345/204 |
| 2004/0049734 A1 | 3/2004 | Simske | |
| 2004/0117215 A1 * | 6/2004 | Marchosky | 705/3 |
| 2004/0139398 A1 * | 7/2004 | Testa et al. | 715/517 |
| 2004/0183918 A1 * | 9/2004 | Squilla et al. | 348/211.2 |
| 2005/0157343 A1 * | 7/2005 | Tani et al. | 358/1.18 |
| 2006/0198559 A1 * | 9/2006 | Manico et al. | 382/305 |
| 2007/0168467 A1 * | 7/2007 | Hu et al. | 709/219 |
| 2007/0188793 A1 * | 8/2007 | Wakai | 358/1.14 |

FOREIGN PATENT DOCUMENTS

| | | |
|---|---|---|
| CN | 101018271 | 8/2007 |
| WO | 2008/104495 | 9/2008 |

* cited by examiner

*Primary Examiner* — Matthew Bella
*Assistant Examiner* — Jose M Torres
(74) *Attorney, Agent, or Firm* — Thomas J. Strouse; Raymond L. Owens

(57) ABSTRACT

The present invention relates to a system and method for data storage and retrieval, and more particularly, for indicating that ancillary data is stored in a header of a JPEG file and accessible to a user. The system comprises a JPEG file having an EXIF header and associated image data, and at least one other file of digital data, and a computer. The computer is programmed to scan the JPEG image file for a special indicator in the application marker section of the EXIF header. If the marker is present, the value of marker indicates what type of ancillary digital data is present in the header. For instance, if the marker contains the string EKC-JPEG, then the ancillary data is known to be another JPEG file. Other types of data can be indicated as appropriate. The presence of the ancillary data is then used for the appropriate type of presentation to the user. A reveal icon is then used in presenting the data to indicate whether the ancillary data is another JPEG file, video, audio, sound, document, etc. The user would be presented with the data as appropriate.

21 Claims, 6 Drawing Sheets

STORING AND PRESENTING ANCILLARY INFORMATION OBTAINED FROM SCANNED PRINTS

FIELD OF THE INVENTION

The present invention relates to a system and method for data storage and retrieval, and more particularly, for indicating that ancillary data is stored in a header of a JPEG file and accessible to a user.

BACKGROUND OF THE INVENTION

Hardcopy prints typically provide ancillary data to supply additional information for an area of interest and can enhance the analysis of key data in the print. Postcards, for example, provide a unique form of ancillary data. On the back of a postcard image, ancillary data information such as stamps, user notes, dates, addresses, and other types of annotation can be found. This data typically provides additional information to a reader of the postcard. Other types of ancillary data include size, shape, and texture (i.e., Histogram) information, information from the back of the print such as watermarks, manufacturer marks, photofinisher marks and consumer marks. In addition, ancillary data can be in a variety of formats, such as audio, video and the like.

Ancillary data can be scanned and compressed using standard JPEG compression. Embedding this compressed ancillary data into a JPEG file offers many practical uses. For example, still images or pictures may be transmitted over the Internet with an accompanying audio file, which can be a person's voice describing the picture. This allows families to share pictures including a family member's voice.

Currently, techniques exist for associating ancillary data with JPEG files. For example, users wishing to create digital images with sound can attach a separate audio file to their image file, e.g., .mp3. However, .mp3 files break down often in that they are easily corrupted or detached during transmission and storage. Another problem with .mp3 files is that they require special software to be saved and used, such as Microsoft Media® software.

Scanned prints are a unique type of image and ancillary data. A scanned print contains both an image and non-image side. Typically when prints are scanned, only the image side is scanned and saved as a digital file. However, many times the non-image side contains information that can be valuable to the viewing experience. The non-image side can contain manufacturer marks in the form of a watermark that can be used to identify the year(s) the photo was printed. This date information can be meaningful in the creation of multimedia presentations, scrapbooks, photobooks, etc. Older prints may contain consumer marks in the form of handwritten notes, names of people in the photo, the location of the photo, or other relevant facts. Often the photofinisher places a stamp or mark on the non-image side of the print to identify the date the photo was processed and printed.

The non-image side of a print is typically very uniform except for the previously mentioned markings. This allows the non-image side to be highly compressed resulting in a very small JPEG file. However, this action creates a non-image side JPEG file for the image, which typically needs to be associated with the image side file. This is not a desired situation as the files can easily be separated.

U.S. Pat. No. 5,032,918, issued to Ota et al., and U.S. Pat. No. 5,815,201, issued to Hashimoto et al., discloses audio and image files that are recorded separately and associated with each other. One of the disadvantages with the invention disclosed in Ota et al. is the necessity of maintaining two separate files. This can be very burdensome and vulnerable to loss of association, especially when high volumes of files are involved or when files are archived for long periods of time. U.S. Pat. No. 6,915,012, issued to Osborne, et al., explains how to embed non-JPEG files into an EXIF header using standard marker extensions. However, Osborne does not provide an intuitive, user recognizable technique for readily indicating that non-image side ancillary data is stored in a JPEG EXIF header of an associated image file.

SUMMARY OF THE INVENTION

In general terms, the present invention is a system and method for indicating that ancillary data is stored in a header of a JPEG file and accessible to a user.

One aspect of the present invention includes a method for storing and retrieving ancillary image data obtained from a scanned hardcopy image in a single JPEG file. More particularly, the method includes scanning an image side of a hardcopy image, scanning a non-image side of the hardcopy image, storing a digital file generated from the scanned non-image side of the hardcopy image in an EXIF header of a JPEG file generated from the scanned image side of the hardcopy image, displaying the image side of the scanned hardcopy image having an indicator for extracting the scanned non-image side digital file from the EXIF header of the JPEG file and displaying the scanned non-image side in association with the scanned image side of the hardcopy image.

Another aspect of the present invention includes a system for storing and retrieving ancillary image data obtained from a scanned hardcopy image in a single JPEG file. More particularly, the system includes a scanner for digitizing an image side and a non-image side of the hardcopy image, a memory coupled to the scanner for storing the digitized non-image side of the hardcopy image in an EXIF header of a JPEG file generated from the digitized image side of the hardcopy image, a display for presenting the digitized image side having an indicator for extracting the digitized non-image side from the EXIF header of the JPEG file and displaying the digitized non-image side in association with the digitized image side.

DETAILED DESCRIPTION OF THE INVENTION

Figure 1:
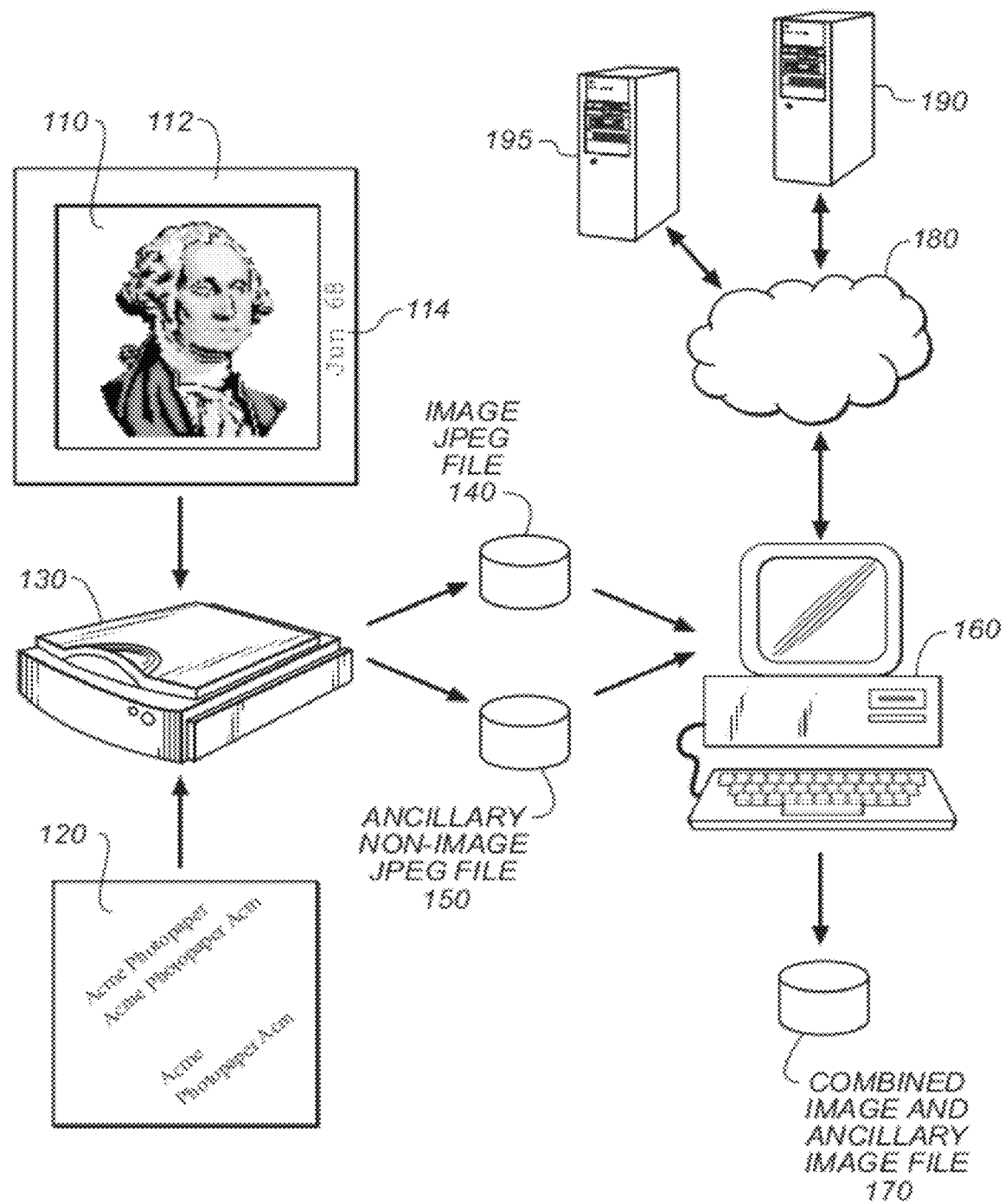
FIG. 1 illustrates a system for creating a combined image file from a scanned print and semantically indexing the content of the image side.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

FIG. 1 illustrates a system 100 for creating a combined image file from a scanned print. This embodiment combines a non-image JPEG file into the header of an associated image JPEG file to create a single JPEG file. Due to the high compression ratio of the non-image side JPEG file, this extra data does not greatly increase the file size of the image side JPEG file. This embodiment allows standard image viewers and editors to manipulate the image data without any knowledge of the extra JPEG file embedded in the image JPEG file. Accordingly, it is important to maintain compatibility with the JPEG standard so that commonly available third party software can be used as needed without any modifications.

More specifically, JPEG is a file format standard used for compressing, storing, and transmitting digital image data. As used herein, the term "JPEG" refers to all versions, revisions, and releases of the format, including "JPEG" and "JPEG 2000." The format was developed by the Joint Photographic Experts Group and it is currently the most popular and widely used image format. One of JPEG's advantages is that it provides the greatest compression of any bitmap format in common use, allowing devices and users to store image files using the least amount of storage space. This compression capability is also one of the features that have made JPEG the most commonly used format for sending pictures over the Internet. Users can transmit and receive images in JPEG more quickly and with a higher degree of image quality than in many other formats.

The JPEG format uses markers to break files into segments. Markers include a first byte having the value 0xFF. JPEG markers can be grouped into two general types, stand-alone and data. A stand-alone maker has no data other than the two bytes of the marker. A data marker is immediately followed by two bytes that indicate the number of bytes of data that follow the marker. This limitation requires ancillary data that is larger than the 65K bytes to be broken up into blocks of 65K or less.

In addition to data for the subject image, JPEG allows ancillary data to be stored within a JPEG file. The ancillary data can include data for applications other than an application that uses image data. For example, data may be inserted into a JPEG file that indicates the setting of the camera that captured the image or the identity of the artist who created the image. In this way, one of the advantages of the JPEG format is that data other than the subject image data can be stored and transmitted in the JPEG file itself. It is important that the ancillary data be contained with the JPEG file so that only one file is used. This eliminates the need for maintaining the multiple files.

As illustrated in FIG. 1, the system 100 provides for the transmission of image data and ancillary data. The system 100 includes a JPEG file 140 having a JPEG data, at least one other piece of embedded ancillary data 150, and a computer 160. The computer 160 is programmed to detect the presence of embedded ancillary data and then extract that data as appropriate. The computer extracts the ancillary data and presents the data to the user as part of a reveal process. The reveal process provides an additional one or more icons in the main image to indicate to a user that there is additional data to be viewed. This additional or ancillary data can be in the form of JPEG file, audio file, music file, video file, document, ASCII characters, shape information, or any other user defined tags.

In FIG. 1, one embodiment of creating a combined image file from a scanned print is shown. If the scanner 130 is equipped with dual cameras, the image side of the print 110 and ancillary non-image side of the print 120 can be scanned in one pass. If the scanner 130 is a simple flatbed scanner, the scanning of the image side 110 and ancillary non-image side 120 can be accomplished in two steps. The image side of the print 110 is scanned and saved to a JPEG file 140 and the ancillary (or non-image) side of the print 120 is saved as a separate JPEG file 150. The computer 160 combines the image JPEG 140 and ancillary non-image JPEG file 150 into a combined file 170 that contains both the image and ancillary (i.e., non-image) files. However, the embodiment is not limited to the image being a print 110, and the image side print could be a slide having a slide mount 112. The slide mount 112 can also have visible and/or invisible data 114 disposed on the front and/or back of the slide mount 112. The data 114 is human and/or machine-readable.

In FIG. 1, computer 160 is further connected to a communication network 180 for the purpose of storing and semantically indexing the combined image 170 files. More specifically, computer 160 can store other sources of digital media files including digital still image files and digital video files. The process of semantically indexing a digital media file will be understood to include by way of example, but not limitation, multiple image classifiers such as material classifiers (i.e. wood, metal, glass, water, rock, grass, sand etc.) and scene classifiers (beach, gray sky, blue sky, sunset, etc.). Further examples of semantic indexing include the detection and recognition of various scene components such as people and objects. Still other indexers include text recognition, voice recognition and voice-to-text recognition.

Semantic indexing in system 100 is accomplished by an indexing server 190 executing software that accepts a digital media file and applies various indexing technologies to create a set of indexed data for each digital media file supplied. Such indexed data can be derived from the image side 110, the ancillary non-image side of the print 120, surrounding slide mount data that has the logo, date, and writing on it, or from any digital media file stored on computer 160. An advertisement server 195 is coupled to the network 180 and operates on the set of indexed data created by indexing server 190. Advertisement server 195 stores a plurality of advertisements that can be combined with the digital image side file that was semantically indexed to create a new combined image file. The new combined image file contains advertisement data and is stored as the ancillary data in the EXIF header of the digital image side file. Advertisement data can be any type of file useful in presenting advertising information correlated to the indexed digital image file. The proper advertisement data is chosen by the advertisement server 195 to closely match the indexed information derived from the image side 110 of print 120 or the image content of the digital image file provided by computer 160.

Figure 2:
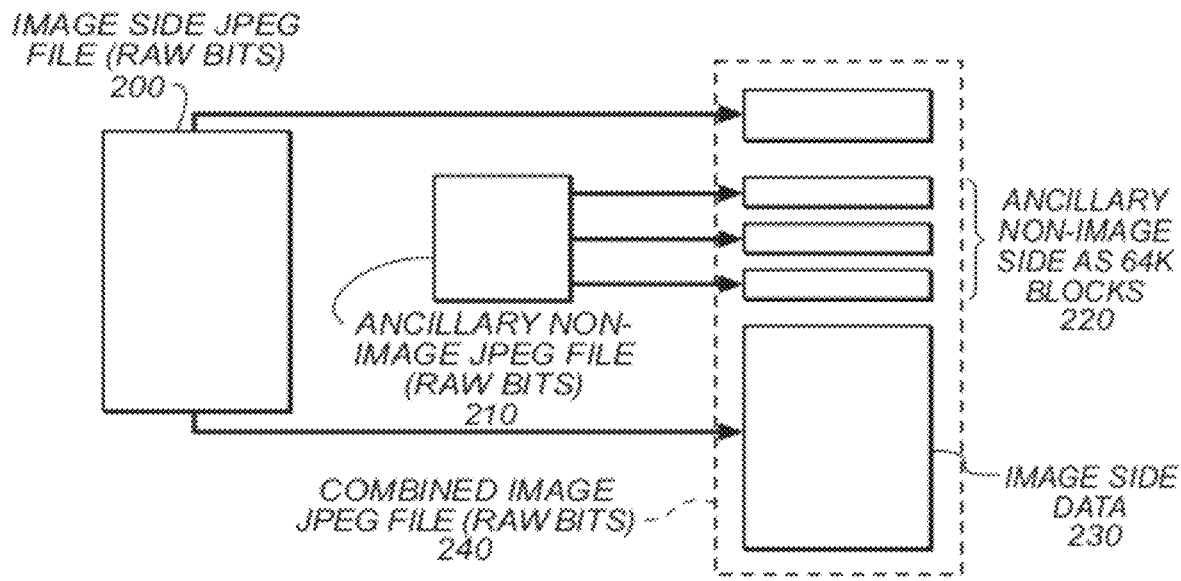
FIG. 2 illustrates the storage of combined image files as a raw JPEG file.

FIG. 2 illustrates the storage of combined image 240 files as a raw JPEG file 200. The image side JPEG 200 and the ancillary non-image side JPEG 210 are combined into one file 240. The ancillary non-image JPEG 210 is broken into 64K blocks 220 to conform to the EXIF app marker standard. The app marker is added to the new combined file 240 and the ancillary file separated into 64K blocks 220. The image side data 230 is then added as the remaining image data into the combined JPEG file 240. The final combined file size is the sum of the image side JPEG 200 and the ancillary non-image JPEG 210. Since the ancillary data for a scanned print is highly compressible, the size of the ancillary non-image JPEG 210 is typically quite small compared to the image side JPEG 200. Accordingly, the combined image file size is not much larger than the image side JPEG 200.

Figure 3:
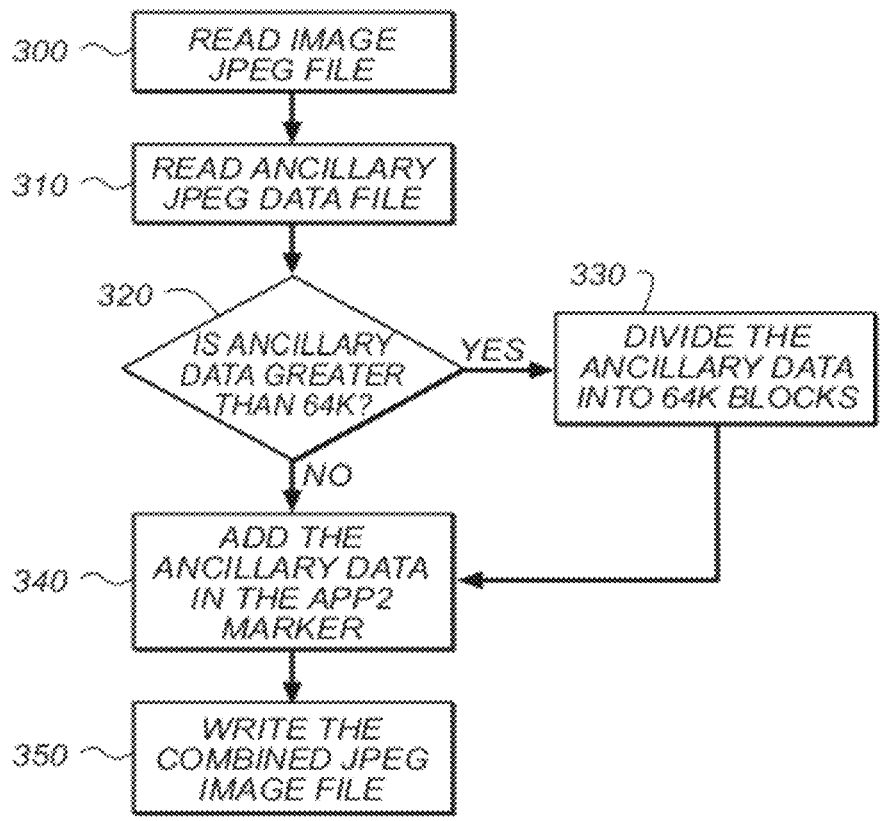
FIG. 3 illustrates a flowchart describing the steps to combine the image side JPEG file and the ancillary non-image side JPEG files into one combined file.

FIG. 3 illustrates a flowchart describing the steps to combine the image side JPEG file and the ancillary non-image side JPEG files into one combined file. The image side JPEG file is read from disk 300 and the ancillary non-image JPEG file 310 is also read from a disk. The size of the ancillary is checked to see if it is greater than 64K 320. If the file size is greater than 64K, the file is divided into 64K blocks 330 until all the data is used. The new combined JPEG file 240 (FIG. 2) is created and the ancillary data blocks are written with app markers into the EXIF header of the image side JPEG file 340. After the ancillary data blocks are written, the original file is appended to the end of the ancillary data and becomes the main JPEG image of the combined file 350.

The advantage of this approach is that normal JPEG viewing and editing programs do not see the extra image added in the app marker section and the user can process the main image if necessary. Also due to the high compressibility of the ancillary non-image JPEG data, this technique does not add a significant amount of extra data to the combined image JPEG data file.

Figure 4:
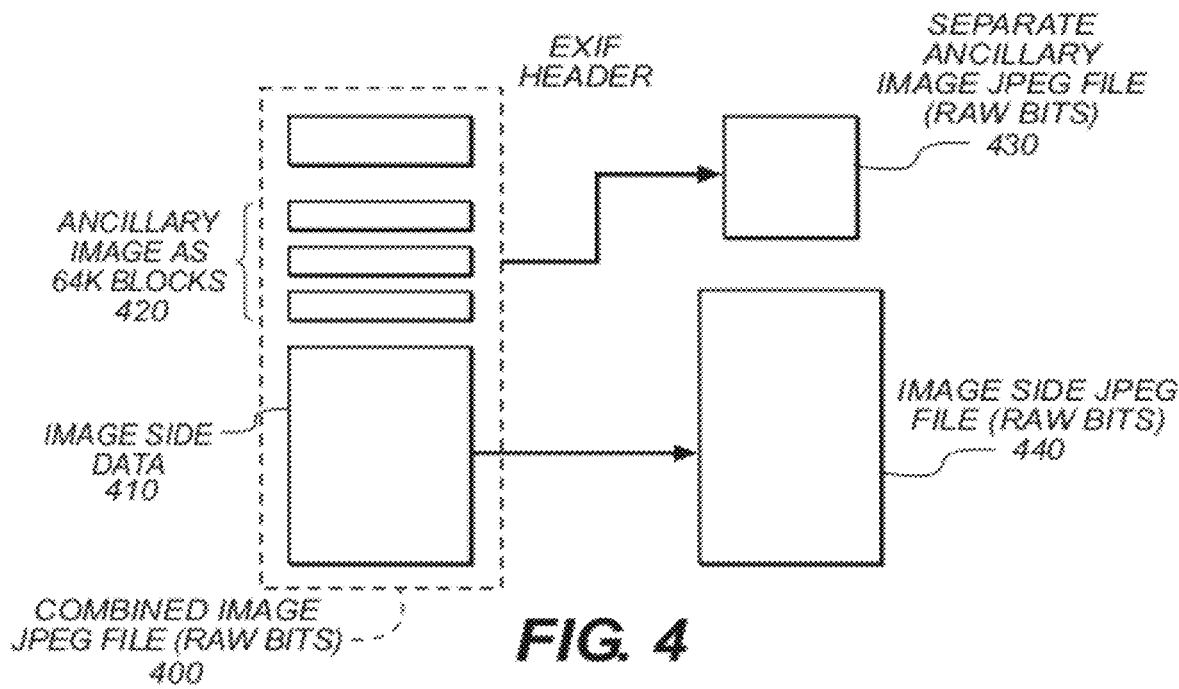
FIG. 4 illustrates the extraction of the image side JPEG file and the ancillary non-image JPEG file from the combined image JPEG file.

FIG. 4 illustrates the extraction of the image side JPEG file 440 and the ancillary non-image JPEG file 430 from the combined image JPEG file 400. The existence of the app marker indicates that there is an embedded ancillary data. Blocks of 64K bytes 420 are read from the combined image JPEG file 400 and are used to reconstruct the ancillary data JPEG file 430. The remaining portion or image side data 410 of the combined file is extracted to form the original image side JPEG file 440. The ancillary non-image JPEG data file 430 data can also be updated and stored again into the combined image JPEG file 400.

Figure 5:
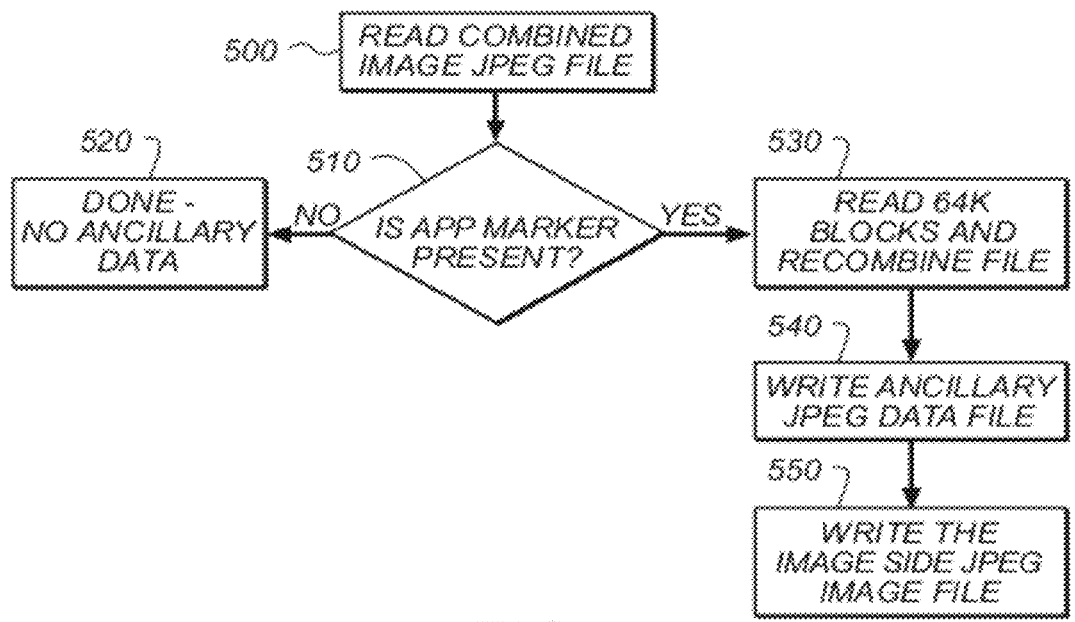
FIG. 5 is a flowchart describing the steps to extract the two image files from the single combined image file.

FIG. 5 is a flowchart describing the steps to extract the two image files from the single combined image file. The combined image JPEG file is read from a disk and is stored in memory 500. The computer checks for the existence of an app marker 510. If an app marker is present, the computer then reads all the blocks of data from the file until the last block is read, and the blocks are combined into one file 530. This combination of data blocks forms the ancillary non-image JPEG data file 540 which can then be written to disk. The image side data is then extracted to form the image side JPEG file (raw bits) 550. If no app markers are present, there is no ancillary data 520.

Figure 6A:
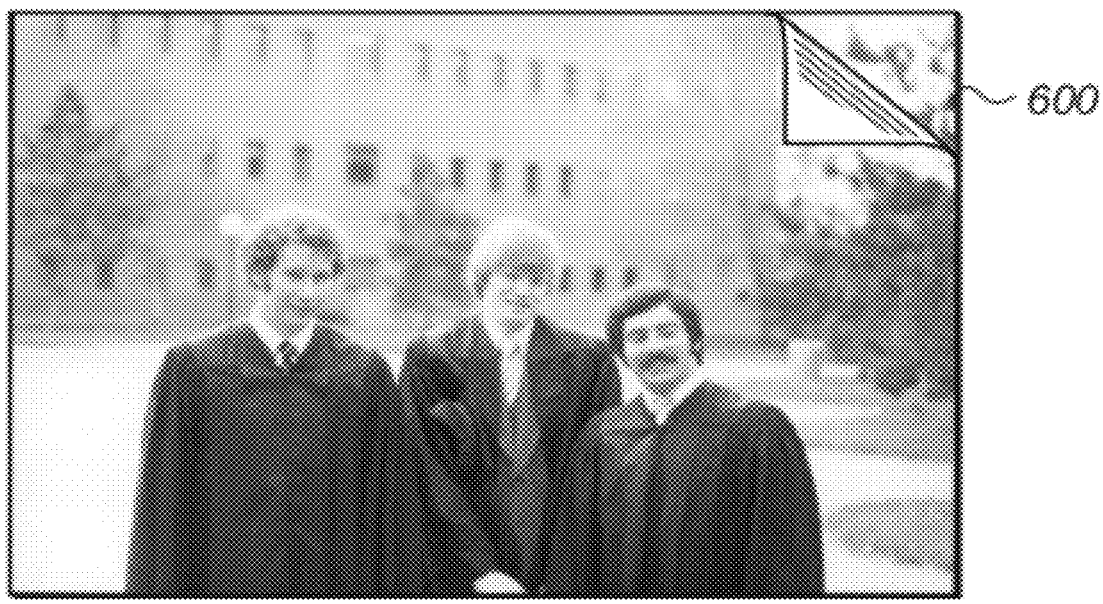
FIG. 6A illustrates one embodiment of an image file displaying a reveal indicator to show the existence of ancillary data in a JPEG file.

FIG. 6A illustrates one embodiment of an image file displaying a reveal indicator 600 to show the existence of ancillary data in a JPEG file. The reveal is used both as an indicator and also as a hotspot on the image to facilitate the exposure of the ancillary data. The reveal indicator 600 can be displayed as a peel mark, icon, and/or indicate what type of data is stored as ancillary data. Accordingly, the reveal indicator 600 can take any shape, form, or texture, machine to indicate what type of data, or format, is stored as ancillary data. Furthermore, the reveal indicator 600 can be in a machine readable (e.g., visible, transparent or translucent) or human readable form.

In one embodiment, the reveal indicator 600 can be a time and/or date in which a user cannot view the stored ancillary data until the time and/or date are reached. For example, a user can select the reveal indicator 600 that is in the form of a time and/or date. A message will be displayed stating that the information cannot be accessed until the specified time and/or date. In another embodiment, the reveal indicator 600 will not be displayed along with the image side digital file until a predetermined time is reached or threshold is satisfied. In this embodiment, the time/date may be translucent until the particular time/date is reached, then the time/date will become fully visible. In yet another embodiment, a user subsequent to selecting the indicator 600 requires an access key or code.

The reveal indicator 600 can include multiple files. More specifically, the reveal indicator 600 can include one or more audio, video, text, etc. files as ancillary data. Also, the one or more files can provide a different playback for different subjects in the image or different users selecting the reveal indicator 600. For example, an image can include multiple subjects in which each subject is a reveal indicator 600. Different ancillary data is stored for each subject and retrieved for the subject selected.

Also, the reveal indicator 600 can be associated with a specific user. When a user logs on to an operating system, such as Windows™, the user ID is detected and the reveal 600 and messages/ancillary data extracted is dependent upon the particular user logged into the system.

The reveal indicator 600 can also provide a link to a specific location. For example, when a reveal indicator 600 is shown as a Disney icon (e.g., Mickey Mouse ears), selecting this icon will display a Disney webpage or an advertisement for Disney. Similarly, Global Positioning Satellite (GPS) information can be stored as ancillary data. A reveal indicator 600 displayed as a GPS symbol, or the like, having an associated address, will display the addressed location when the symbol is selected. For example, a reveal indicator 600 in the form of a GPS symbol having an associated address of "1600 Pennsylvania Avenue" will display a map, image or similar location information for the White House. Also, in another embodiment, if an image is taken at a specific location, such as at Disney or the White House, an .html page or GPS information can be automatically stored as ancillary data along with the captured image and a reveal indicator 600 of Mickey Mouse ears or the White House, respectively, can be displayed on the image side of the digital photograph.

In another embodiment, recognition software can detect the subject of the image. This recognition can be done in the camera at the time of the image capture or subsequently on a computer at home or at a service provider. Hence, .html information with respect to the subject can automatically be stored as ancillary data. For example, images captured at Disney will have advertisements or web addresses automatically stored as ancillary data in the same JPEG file as the captured image.

Figure 6B:
FIG. 6B illustrates ancillary data on the non-image side of a scanned document.

FIG. 6B illustrates ancillary data on the non-image side of a scanned document. The ancillary data can be a scan of the back of a print (e.g., photographic print, postcard or the like), music, audio, video, document, multimedia data or any other type of digital file. In FIG. 6B, an image 610 is a scan of the back of a print. This information is one form of ancillary data. The information can be shown when the reveal indicator (or hotspot) 600 is selected. The scan of the back of a print in FIG. 6B also contains consumer marks 620 in the form of a handwritten message, photofinisher marks 630 in the form of a stamp containing date information, and also manufactures marks 640 containing a watermark from the manufacturer, which could be used to identify the date the print was made.

Additional ancillary data can be added to an image side digital file during scanning. For example, during the scanning of an image side of a document, the scanner can provide the user with the ability to sign their name during, or subsequent to, the scanning process. The user's signature can be saved as ancillary data in the image side JPEG file.

In another embodiment, ancillary data can be video images pertaining to a still image, i.e., image side of the still image. Accordingly, an image capture set can include one or more of either or both still and video images captured by a capture device. In one embodiment, the image capture set is composed of the combination of a still image and a predetermined number of seconds of video preceding the capture of an image, the combination of the still image and the predetermined number of seconds of video following the capture of an image, and/or combinations thereof. This predetermined number of seconds before and after the capture of an image can provide context to the still image capture when in an image capture set. This video can be stored as ancillary data and all or part of the video can be viewed when a corresponding reveal indicator 600 is selected.

Figure 7A:
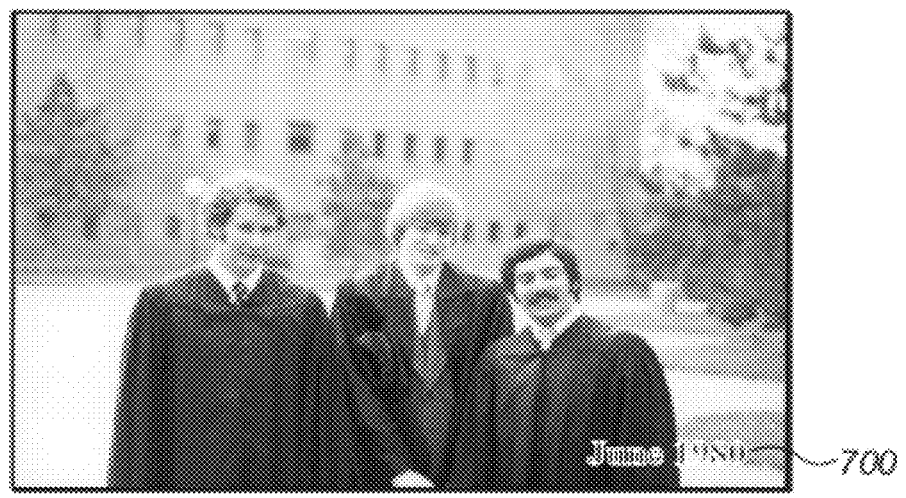
FIGS. 7A-7C contains samples of prints created from both stored image data and ancillary date.
Figure 7B:
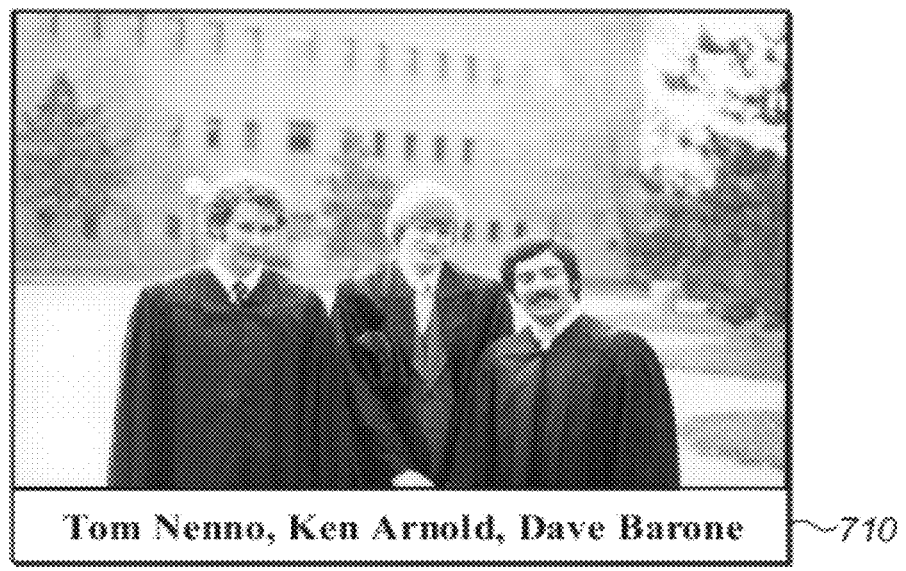
Figure 7C:
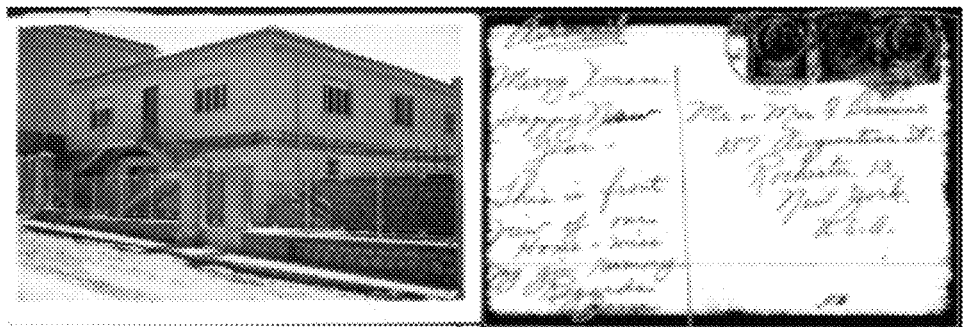

FIGS. 7A-7C contains samples of prints created from both stored image data and ancillary date. FIG. 7A illustrates one example of a print that contains a date code created from the ancillary data 700. The date code was extracted from the photofinisher marks on the non-image side scan and processed with optical character recognition and rendered onto the front image. In FIG. 7B, another application extracts the consumer marks from the non-image side scan and processed with optical character recognition to create a photo with annotation on the front 710. FIG. 7C illustrates a panoramic print 720 which includes a combination of the image and the raw non-image bitmap scan information. These are some of the examples of output that can be generated by utilizing the front image scan and forms of the ancillary non-image data both in its raw form and also in a processed form.

However, the embodiment is not limited to the display of ancillary data as discussed above and any suitable display can be used. For example, the ancillary data can also be displayed as a picture-in-picture, and/or a see-through image displayed over, or in proximity of, the image side. Further, the ancillary data can be displayed for a predetermined period of time after selection.

Figure 8A:
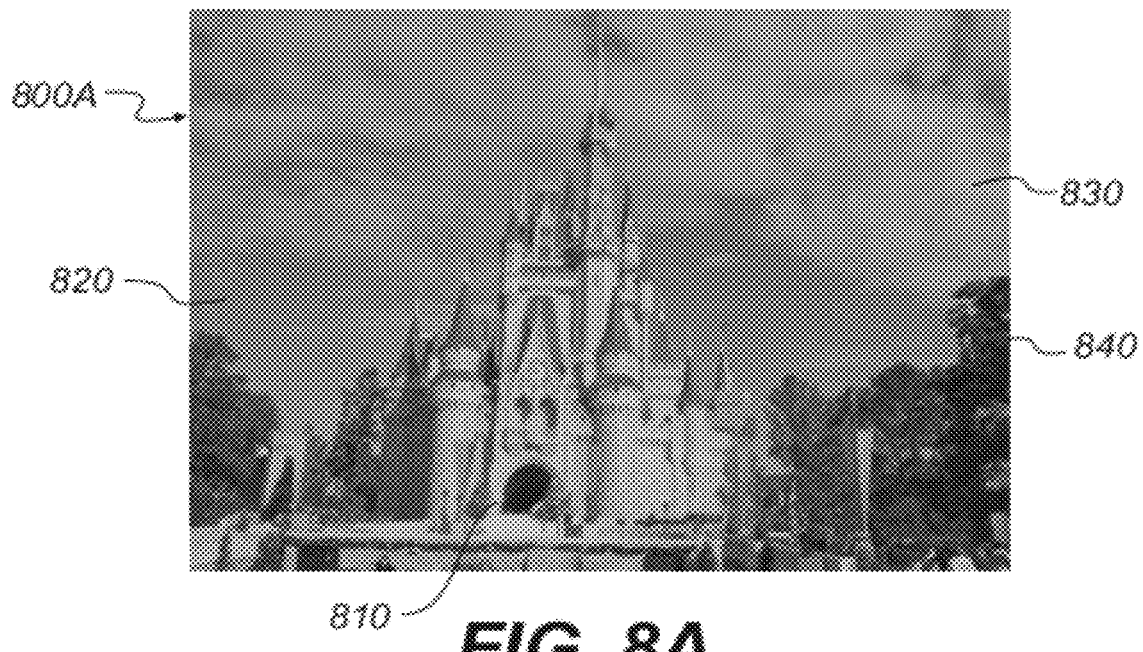
FIGS. 8A and 8B illustrate images used for generating a belief map to be stored in the EXIF header of a JPEG file.
Figure 8B:
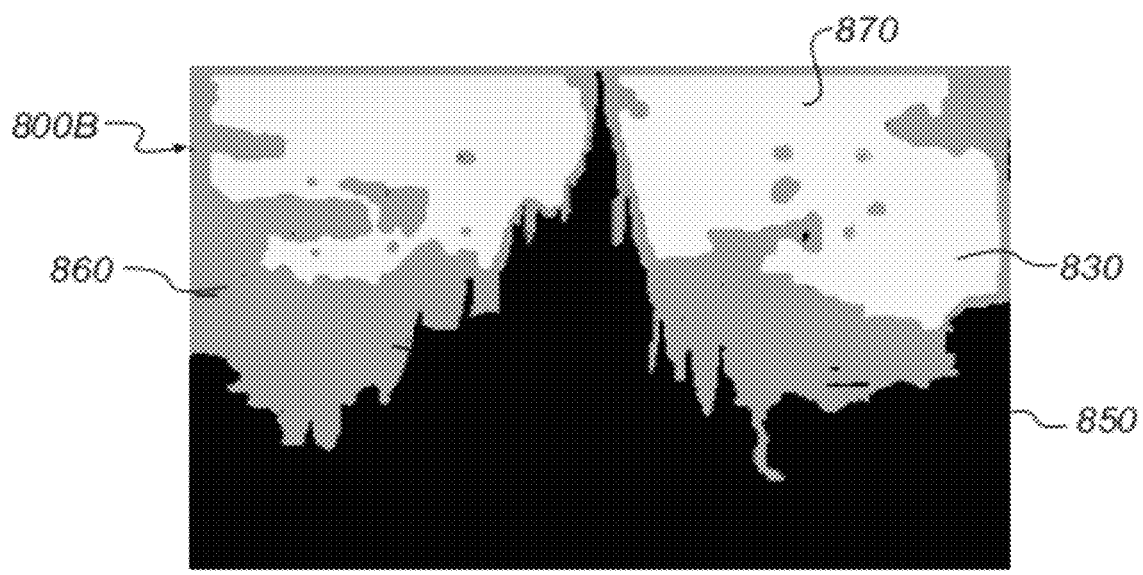

FIGS. 8A and 8B illustrate images used for generating a belief map to be stored in the EXIF header of a JPEG file. A photograph is a way for a photographer to communicate with a viewer, as a speaker does with a listener, or a writer with a reader, and just as the written, or spoken, word conveys a message about some topic of interest, so does a photograph. Generally, a photograph is taken when the photographer sees people, objects, or events worthy of capturing, to preserve a memory or to share an experience with others. In either case, the photographer intends to convey to a viewer his or her interest in one or more main subjects.

Mechanisms for conveying the photographer's interests to the viewer include controlling the position of the main subject within the frame, arranging for a contrast in tone, color, or texture between the main subject and its surroundings, and highlighting the main subject with the brightest light. To the degree that a photographer is successful in emphasizing the main subject in a particular picture, a group of independent third-party viewers will agree well with one another as to the main subject, and we argue that this agreement will reflect the intention of the photographer.

An automatic system does not have the specific knowledge that the photographer may have about the people, setting, event, and so on. Accordingly, computer algorithms are used to identify, for example, the main subject in a photograph in a statistical sense that reflects the degrees of uncertainty or ambiguity inherent to such a task. For this identification, the algorithms perform object segmentation, object recognition and main subject determination by semantics. For semantic features, semantic object classes (such as sky, grass, skin, etc.) that are frequently seen in photographic pictures are detected. Semantic features can be used to classify various regions in the image such as foreground (e.g. skin, face, etc.) and background regions (e.g., sky, grass, etc.) of semantic meanings. In addition, they can also be used to infer properties of compound objects such as people, or to enable coherent reasoning (e.g., uniform treatment of multiple unconnected grass or sky regions). The evidence from both semantic and structural types of features is integrated to yield a belief map of the main subject. The belief map, for example, is a binary map that indicates location of the determined main subject. Further, a set of likelihood values, or belief values, are obtained and attached to the various regions for indicating a degree of certainty of the type of semantic object. More specifically, the belief values provide evidence of main subject detection.

The belief map can be stored as ancillary data in the EXIF header of a JPEG file. This information can be retrieved and displayed by selecting the reveal indicated on a displayed image. For example, the digital image 800A displays a white castle 810, a blue sky 820, white clouds 830 and green trees 840. If it is determined that the subject of the image is the clouds 830, then in FIG. 8B, the belief map 800B illustrates a particular color convention scheme is used to determine the probability of detecting the clouds 830. More specifically, the color black 850 is considered a low probability of detection, the color gray 860 is a slightly higher probability, and the color white 870 is the highest probability of detection. However, the invention is not limited to this color scheme and any suitable scheme can be used. For example, texture, symbols or the like can be used for illustrating probabilities.

In another embodiment, a digital image is file processed by an indexing computer to determine aspects of the image, such as sky, grass, beach, sand, people, objects or the like. A belief map is generated and can be stored as ancillary data that another computer can process. Accordingly, the indexing computer 190 (FIG. 1) can index the digital image with respect to other pictures in the same event and create better index data by looking at a plurality of related images. If the same digital image was indexed independent of other related images, many errors could occur that would produce undesirable index information.

Also, indexing is computationally intensive and takes time. For example, a kiosk could index the digital image but may lack the processing power or the time to do it efficiently. Hence, generating a pre-indexed picture is valuable. If the indexed data is stored as a pixel map, it can more readily be used to compute likeness to other images rather than simply comparing stored metadata. Also metadata is fixed data. Either it is a blue sky or it is not a blue sky. Storing the pixel map embedded preserves the probability as well as the location of the pixels that were indexed. In another embodiment, a multilayer image file can be used in which each layer is another probability for a specific classifier. For example, the digital image can be stored as a tif file or other multilayer file format in which data from individual classifiers can be stored and retrieve from individual layers of the file. For example, one layer is for a white castle, one layer is for a blue sky, one layer is for white clouds and one layer is for green trees.

Alternately, the high probability layers can have different color codes used to represent individual classifiers forming a single layer composite file.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

Parts List:

| | |
|---|---|
| 100 | system |
| 110 | image side of scanned print |
| 112 | mount |
| 114 | data |
| 120 | non-Image side of scanned print |
| 130 | scanner |
| 140 | image JPEG file |
| 150 | ancillary non-image JPEG file |
| 160 | computer |
| 170 | combined image and non-image JPEG files |
| 180 | network |
| 190 | indexing server |
| 195 | advertising server |
| 200 | raw image JPEG files |
| 210 | raw ancillary non-image JPEG files |
| 220 | 64K blocks |
| 230 | image side data |
| 240 | combined image and non-image raw JPEG files |
| 300 | read image JPEG file |
| 310 | non-image ancillary data JPEG file |
| 320 | size of the non-image JPEG file and compares with 64K |
| 330 | divides the non-image JPEG file into 64K blocks |
| 340 | adds the APP2 marker to the EXIF header and the 64K blocks |
| 350 | write combined image JPEG file |
| 400 | combined image JPEG file |
| 410 | image side data |
| 420 | blocks of 64K bytes |
| 430 | extracted ancillary non-image JPEG file |
| 440 | extracted ancillary image side JPEG file |
| 500 | combined image JPEG file |
| 510 | app marker |
| 520 | ancillary non-image data |
| 530 | combined blocks into one JPEG file |
| 540 | ancillary non-image JPEG file |
| 550 | raw image JPEG files |
| 600 | reveal indicator |
| 610 | ancillary non-image JPEG file |
| 620 | consumer mark |
| 630 | photofinisher mark |
| 640 | manufacturer mark |
| 700 | date code extracted from photofinisher mark |
| 710 | text extracted from consumer mark |
| 720 | panoramic photo print with image and non-image data |
| 800A | digital image |
| 800B | belief map |
| 810 | castle |
| 820 | sky |
| 830 | clouds |
| 840 | trees |
| 850 | color black |
| 860 | color gray |
| 870 | color white |

The invention claimed is:

1. A method for storing and retrieving ancillary image data obtained from a scanned hardcopy image in a single JPEG file, comprising:
   scanning an image side of a hardcopy image;
   scanning a non-image side of the hardcopy image;
   storing a digital file generated from the scanned non-image side of the hardcopy image in an EXIF header of a JPEG file generated from the scanned image side of the hardcopy image and providing at least one indicator for indicating the existence of ancillary image data stored within the EXIF header of the JPEG file when ancillary data is present; and
   displaying the image side of the scanned hardcopy image having the indicator and using the indicator to facilitate the display of the scanned non-image side in association with the scanned image side of the hardcopy image.

2. The method of claim 1, wherein displaying the image side of the scanned hardcopy image having the indicator further comprises displaying the indicator in the form of a machine readable code.

3. The method of claim 1, wherein displaying the image side of the scanned hardcopy image having the indicator further comprises displaying the indicator in the form of a visual icon.

4. The method of claim 1, wherein displaying the image side of the scanned hardcopy image having the indicator further comprises displaying the indicator as a date/time, restricting the user from viewing the scanned non-image side if the date/time is in the future.

5. The method of claim 1 further comprising storing data having one or more formats selected from a group consisting JPEG, AVI, TIFF, MOV, MP3, WAV, M4P, M4A, TXT and DOC in an EXIF header of a JPEG file generated from the scanned image side of the hardcopy image.

6. The method of claim 1 further comprising displaying the digitized image side and non-image side in proximity to one another.

7. The method of claim 1 further comprising presenting the digitized image side and non-image side in individual proper orientations.

8. The method of claim 1, wherein scanning the image side of a hardcopy image further comprises digitizing the image side to be compatible with existing standard JPEG viewers and editors.

9. The method of claim 1 further comprising presenting the digitized image side and non-image side on at least one device selected from a group consisting of a digital media frame, a portable self contained media viewer, a computer, a television, a game system, a set top box, digital camera, cell phone camera and hardcopy media.

10. The method of claim 1 further comprising providing an access key for extracting the scanned non-image side digital file.

11. The method of claim 1 further comprising updating the non-image side digital file.

12. A system for storing and retrieving ancillary image data obtained from a scanned hardcopy image in a single JPEG file, comprising:
   a scanner for digitizing an image side and a non-image side of the hardcopy image;
   a memory coupled to the scanner for storing the digitized non-image side of the hardcopy image in an EXIF header of a JPEG file generated from the digitized image side of the hardcopy image and providing at least one indicator for indicating the existence of ancillary image data stored within the EXIF header of the JPEG file when ancillary data is present; and
   a display for presenting the digitized image side having the indicator and using the indicator to display the digitized non-image side in association with the digitized image side.

13. The system of claim 12, wherein the indicator is in the form of a machine readable code.

14. The system of claim 12, wherein the indicator is in the form of a visual readable indicator.

15. The system of claim 12 wherein the digitized non-image side further comprises storing data having one or more formats selected from a group consisting JPEG, AVI, TIFF, MOV, MP3, TXT and DOC in an EXIF header of a JPEG file generated from the scanned image side of the hardcopy image.

16. The system of claim 12, wherein the digitized image side and non-image side are in proximity to one another.

17. The system of claim 12, wherein the digitized image side and non-image side is displayed in individual proper orientations respectively.

18. The system of claim 12, wherein the image side is digitized to be compatible with existing standard JPEG viewers and editors.

19. The system of claim 12, wherein the digitized image side and non-image side are presented on at least one device selected from a group consisting of a digital media frame, a portable self contained media viewer, a computer, a television, a game system, a set top box, digital camera, cell phone camera and hardcopy media.

20. The system of claim 12 further comprising an access key for extracting the scanned non-image side digital file.

21. The system of claim 12, wherein the non-image side digital file can be updated.

* * * * *